United States Patent
Beissbarth

[11] 3,712,128
[45] Jan. 23, 1973

[54] TEST STAND FOR VEHICLE BRAKES

[76] Inventor: Osmond Beissbarth, Sulzbacherstrasse 15, 8 Munich 23, Germany

[22] Filed: May 21, 1971

[21] Appl. No.: 145,638

[30] Foreign Application Priority Data

May 25, 1970   Germany.....................P 20 25 549.6

[52] U.S. Cl....................................................73/126
[51] Int. Cl................................................G01l 5/28
[58] Field of Search....................73/126, 123, 117

[56] References Cited

UNITED STATES PATENTS

| | | | |
|---|---|---|---|
| 1,946,133 | 2/1934 | Du Bois | 73/126 X |
| 1,685,297 | 9/1928 | Shone | 73/126 |
| 1,873,051 | 8/1932 | Semmes | 73/126 X |
| 1,918,026 | 7/1933 | Fullerton et al. | 73/126 |
| 1,946,101 | 2/1934 | Norton | 73/126 X |

*Primary Examiner*—Jerry W. Myracle
*Attorney*—Edmund M. Jaskiewicz

[57] ABSTRACT

The right and left front or rear wheels of a vehicle are driven by a common motor via a common driving shaft. Two measuring beams, one for the right and one for the left wheel, are mounted on the shaft so as to be freely rotatable relative to the shaft. Each vehicle wheel is driven from the shaft by a chain or belt surrounding guide wheels mounted on each beam. The braking forces exerted on each wheel are separately detected by means of gauges connected to each measuring beam.

6 Claims, 2 Drawing Figures

TEST STAND FOR VEHICLE BRAKES

BACKGROUND OF THE INVENTION

This invention relates to a device for testing the brakes of a vehicle, particularly to a testing device in which the vehicle wheels are externally driven by the testing device while the vehicle itself is stationary.

The testing of vehicle brakes is extremely important to avoid traffic accidents. The efficiency of the brakes, i.e., of the braking forces dependent on the pressure exerted on the brake pedal, must be measured not only as to their total amount but also in their relation to each other since these forces given an indication of the deceleration and the straight-forward motion of the vehicle when the braking forces are applied.

PRIOR ART

Generally, test stands for vehicle brakes have been designed in which the wheels of the front or rear axle of the vehicle are placed between two pairs of rolls and in which the right and left wheels are separately driven by two electrical motors. Upon actuation of the brakes the measurement has been carried out by measuring the force of each driving electrical motor with the moment arm being known. Alternatively, the measurement has been carried out by measuring the power input of each electrical motor.

SUMMARY OF THE INVENTION

It is the object of the present invention to provide a device for testing vehicle brakes in which only one motor and two separate gauges are employed to measure the braking force of the right and the left wheel, respectively.

Briefly, a drive wheel is rotated by a motor through chains or belts. The drive wheel drives the pairs of rolls, on which the vehicle wheels are placed, through additional chains or belts provided separately for the right and left sides.

When the braking forces are produced in addition to the small resistance of the tires and bearings they create corresponding additional torques acting on the motor. According to the invention, these torques are measured by arranging two measuring beams on the main shaft of the drive wheel rotatable relatively to the shaft and provided with one or preferably two sprockets or pulleys acting as guide rollers for the chains or belts. The torques or—if the moment arms are known—the forces which correspond to the braking forces can thus be measured by the measuring beams.

BRIEF DESCRIPTION OF THE DRAWINGS

A preferred embodiment of the invention will now be described with reference to the drawings, which are merely exemplary, wherein.

DETAILED DESCRIPTION OF PREFERRED EMBODIMENT

Figure 1:
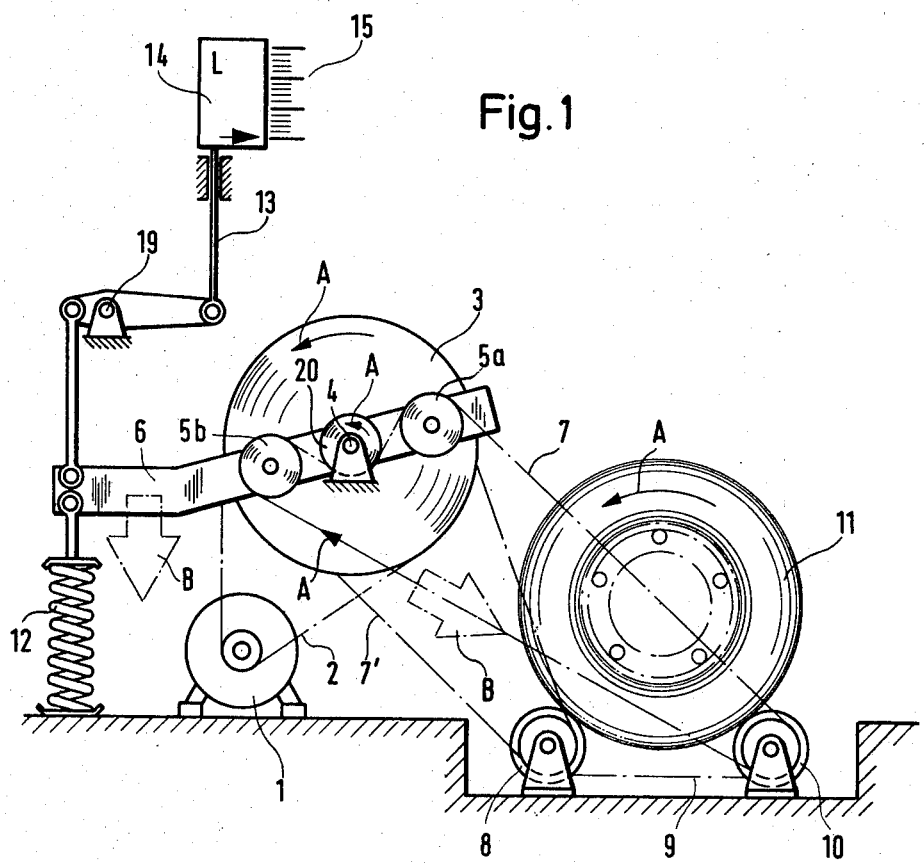
FIG. 1 is a diagrammatic side elevation of the device as viewed from the bottom in FIG. 2.
Figure 2:
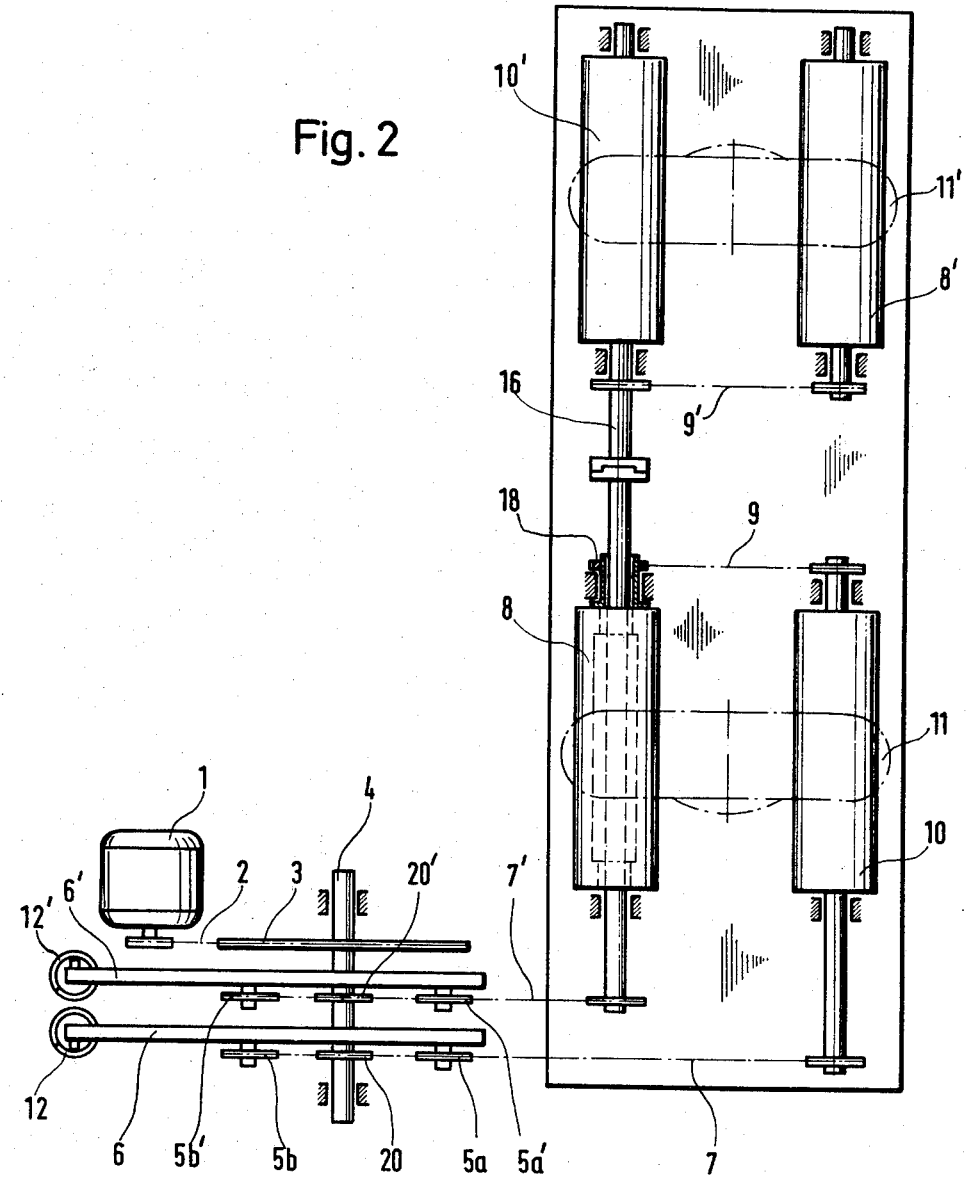
FIG. 2 is a diagrammatic plan view of the device.

As shown in the drawings, an electrical motor 1 drives a common drive wheel 3 through a chain or belt 2. The drive wheel 3 is fixed on a main shaft 4 on which smaller drive wheels 20, 20' are also mounted so as to rotate with the shaft 4 and the drive wheel 3. The rear roll 10 of the left-hand pair of rolls is driven by the small drive wheel 20 via a chain or belt 7, and the front roll 8 of the same pair of rolls is driven from the rear roll 10 via a further chain or belt 9 and a driving wheel 18 fixed to the front roll 8.

The right-hand pair of rolls 8', 10' is driven separately of the left-hand pair of rolls 8, 10. The front roll 10' of the right pair of rolls is rotated by the small drive wheel 20' via a chain or belt 7' and a shaft 16, and the rear roll 8' is rotated from the front roll 10' through another chain or belt 9'. The shaft 16 freely passes through the front roll 8 of the left pair of rolls; the driving wheel 18 is fixed only to the roll 8 while being free to rotate relatively to the shaft 16.

For measuring the torques, two measuring beams 6, 6' are mounted on the main shaft 4 of the drive wheel 3 and are provided with one or preferably two guide rollers 5a, 5b and 5a', 5b', respectively. The measuring beams 6, 6' are freely rotatable with respect to the main shaft 4; the guide rollers 5a, 5b and 5a', 5b' are rotatably mounted on the respective measuring beam 6, 6'. The measuring beams are at one end extended and connected to counter-acting compression springs 12, levers 13 and gauges 14 which provide a reading of the respective braking forces.

In FIG. 1, only the spring 12 and the measuring arrangement comprising the levers 13 and the gauge 14 for the left-hand wheel 11 of the vehicle to be tested are seen. A similar arrangement is connected to the measuring beam 6' for the right-hand vehicle wheel 11'.

According to the invention, the gauges 14 are preferably in the form of flat sliders which are provided with pointers and which, under the action of the braking forces, slide along stationary scales 15. The gauges 14 are arranged according to the invention so as to be readable from two sides so that the operator can read the breaking forces when testing the brakes of the front axle as well as when testing those of the rear axle. The gauges 14 can be provided with letters R and L, respectively, or with different colors to distinguish between the right and left vehicle wheel.

In operation, the electrical motor 1 drives the vehicle wheels 11, 11' via the drive wheel 3, the small drive wheels 20, 20', the chains or belts 7, 7' and the rolls 10, 8, 10', 8'. The running direction of the various drive elements is indicated by arrows A in FIG. 1.

When the respective braking forces are applied to the vehicle wheels 11, 11' corresponding torques are generated which are transmitted by the chains or belts 7, 7' and the guide rollers 5a, 5b and 5a', 5b', respectively, and are detected separately by the measuring beams 6 and 6'. The direction of these torques are indicated by arrows B in FIG. 1.

According to FIG. 1, the braking force exerted on the left wheel 11 causes a counter-clockwise rotation of the measuring beam 6 whereby the extension of the measuring beam is urged downwardly against the force of the compression spring 12. Through the lever system 13 pivotally supported at 19, the pointer of the gauge 14 is thereby moved upwardly along the scale 15 by an amount corresponding to the braking force.

A similar action takes place in the measuring arrangement (not shown) for the right wheel 11'.

It is understood that this invention is susceptible to modification in order to adapt it to different usages and conditions and, accordingly, it is desired to comprehend such modifications within the invention as may fall within the scope of the appended claims.

What is claimed is:

1. A device for testing vehicle brakes comprising two pairs of rolls for receiving and rotating two vehicle wheels to be tested, a single motor having a main drive shaft, and transmission means comprising two chain or belt means and a driven member connected to said main drive shaft for coupling said pairs of rolls to said main drive shaft and including two measuring beams mounted on said main drive shaft for measuring the respective braking forces of said vehicle wheels, said beams carrying two guide rollers each on either side of the driven member, each of said chain or belt means passing around said two guide rollers and said driven member to transmit the braking forces to said measuring beams.

2. A device as claimed in claim 1, further comprising two gauge means for separately detecting the brake forces applied to the two vehicle wheels, each of said measuring beams including an extension connected to spring means counteracting the respective braking force, each of said extensions being further coupled to one of said gauges through lever means.

3. A device as claimed in claim 2, wherein each said gauge means includes a stationary scale and a flat slider movable along said scale.

4. A device as claimed in claim 2, wherein each of said gauge means includes scale means visible from two sides.

5. A device as claimed in claim 2, wherein said gauge means are provided with letters "R" and "L," respectively, to identify the right and left vehicle wheels.

6. A device as claimed in claim 2, wherein said gauge means are provided in different colors to distinguish between the right and left vehicle wheels.

* * * * *